Sept. 25, 1951     M. H. STORCH     2,568,833
BLADE AND HANDLE SECURING MEANS
Filed Nov. 27, 1948
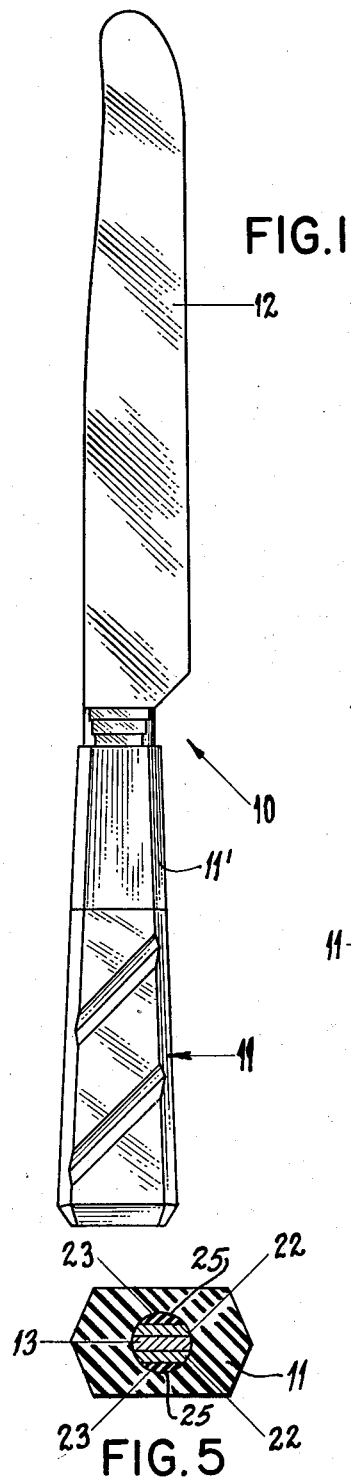
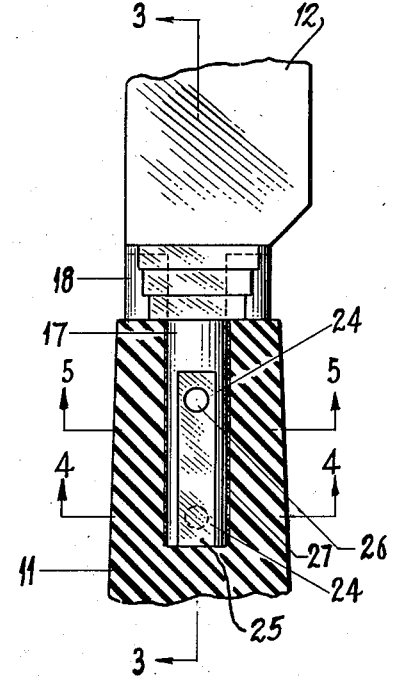
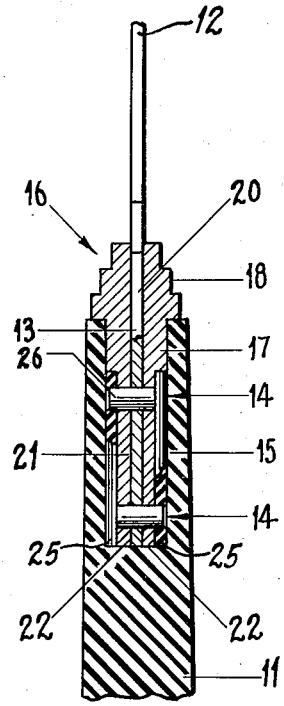
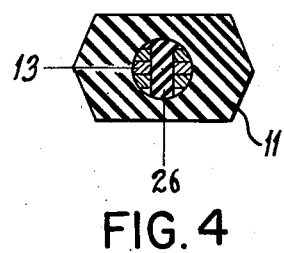
MAX H. STORCH
INVENTOR
BY *Joseph Blacker*
ATTORNEY Patented Sept. 25, 1951

2,568,833

UNITED STATES PATENT OFFICE 2,568,833

BLADE AND HANDLE SECURING MEANS

Max H. Storch, Belle Harbor, N. Y.

Application November 27, 1948, Serial No. 62,360

2 Claims. (Cl. 30—342)

This invention relates to improvements in fastener installations for securing a knife blade to a handle and which is disposed within the handle so as to be completely concealed by the handle when in assembled relation.

An object of this invention is to provide a plastic cutlery handle having an elongated tubular opening which opens at one end thereof, and made of non-transparent plastic material at least at that end, so as to completely conceal the blade shank and the blade securing means.

Another object of this invention is to provide a cylindrical and bifurcated blade engaging member having two arms disposed within the opening in the handle and having an enlarged and slotted head portion abutting the handle, the slot forming a continuation with the opening between the arms of the blade engaging member so as to permit the blade shank to pass through the slot and through the opening formed by the bifurcation, and to provide means for interlocking the blade shank with the blade engaging member.

Another object of this invention is to provide two apertures in the shank of the blades and two apertures in each arm of the blade engaging member aligned with the shank apertures, and to recess the outer surface of each arm in rightangular relation with the apertures to provide seats for two plastic securing members each having an aperture and a lateral projection of a length so as to pass through and interlock the blade shank with the blade engaging member.

Another object of this invention is to assemble the interlocked blade and the bifurcated blade engaging member and the two plastic securing members inside the opening in the plastic handle so that the plastic securing members are in direct engagement with the plastic material of the handle, plastic cement being applied to the outer surfaces of the plastic securing members prior to insertion into the handle, whereby the plastic cement forms a permanent junction or bond between plastic and plastic, that is, between the plastic parts, which serves to securely but indirectly lock the blade metal to the plastic handle.

The importance of providing plastic securing members fitting lengthwise of the outer faces of the arms of the bifurcated blade engaging member is that in practice it is found that when two metallic surfaces are cemented together there is no permanency in the junction thus formed. In the construction herein disclosed the junction is made by cementing a plastic member against another plastic member and this form of structure provides a permanently reliable junction.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of a knife embodying the invention.

Figure 2 is a central cross-sectional view of the knife shown in Figure 1, on an enlarged scale.

Figure 3 is a cross-sectional view taken on line 3—3 in Figure 2.

Figure 4 is a cross-sectional view taken on line 4—4 in Figure 2.

Figure 5 is a cross-sectional view taken on line 5—5 in Figure 2.

In the illustrated embodiment of the invention, the numeral 10 indicates a culinary knife comprising a handle 11 made of plastic material and a knife blade 12 having a shank 13 with two transverse openings 14.

The handle 11 has an elongated tubular opening 15 which opens at the shank engaging end. A blade engaging member 16 has a bifurcated cylindrical portion 17 fitting in the opening 15 and an enlarged head portion 18 which abuts the handle 11.

The head portion 18 has a through opening 20 of rectangular cross-section and which forms a continuation with the opening 21 between the arms 22 of the bifurcated cylindrical portion 17.

Each arm 22 has a recess 23 on its outer surface. Each arm 22 has two apertures 24 in a crosswise direction with the distance apart the same as the distance between the openings 14 in the blade shank 13.

An elongated plastic securing member 25 having a transverse cylindrical extension 26 at one end is seated in each recess 23 in the blade engaging member 16. The securing members 25 are reversely arranged in the opposite recesses so that the extension 26 of one member 25 passes through the upper aperture 24 while the extension 26 of the other member 25 passes through the lower aperture 24.

Each transverse extension 26 is of a length to pass through both arms 22 of the blade securing member 18 and through the blade shank 13 and through the other plastic securing member 25 when the members are in assembled relation. It will be noted that the ends of the transverse extension 26 terminate in concealed relation within the tubular opening 15 in the handle 11.

Plastic cement is applied to the contacting surfaces between the plastic handle 11 and the plastic securing members 25 and secures these plastic parts in permanent union. This arrangement permits the extensions 26 to hold the blade shank 13 and the blade engaging member 16 in unitary inseparable relation with the handle 11.

The arrangement as shown in the drawings is necessary due to the great difference in the coefficients of expansion of the steel used in the blade and the plastic material constituting the handle. A cement bond between steel and plastic materials is not permanent. A cement bond between plastic materials having the same coefficient of expansion is permanent.

It is to be noted that the end of the handle 11 nearest the blade 12 is made of non-transparent plastic material 11' to completely conceal the blade shank and the blade securing means.

In accordance with the patent statutes I have described and illustrated the preferred embodiment of my invention, but it will be understood that various changes and modifications can be made therein without departing from the spirit of the invention as defined by the appended claims.

I claim:

1. A mounting for a blade having a shank with two transverse openings comprising in combination a handle made of plastic material and having an elongated tubular opening which opens at one end thereof, a cylindrical and bifurcated blade engaging member having two arms disposed within said opening and having an enlarged head portion abutting said handle, said head portion having a through opening forming a continuation with the opening between the arms of said blade engaging member, said arms being recessed on their outer faces, said arms being apertured at two points in a crosswise direction with the distance apart the same as the distance between the openings in said blade shank, two plastic securing members respectively seated in said recesses, each of said plastic securing members having a transverse extension of a length to pass through both arms of said engaging member and through said blade shank and through the other plastic securing member when said members are in assembled relation, said transverse extensions terminating in concealed relation within said handle, and plastic cement joining said plastic handle and said plastic securing members, thereby causing said lateral plastic extensions passing through said transverse blade openings to hold said blade and said blade engaging member in unitary relation with said handle.

2. A mounting for a blade having a shank with transverse openings comprising in combination a handle made of plastic material and having an elongated tubular opening which opens at one end thereof, blade engaging arms fitting within said opening, said arms being recessed on their outer faces, said arms being apertured at two points in a crosswise direction with the distance apart the same as the distance between the openings in said blade shank, two plastic securing members respectively seated in said recesses, each of said plastic securing members having a transverse extension of a length to pass through both arms and through said blade shank and through the other plastic securing member when said members are in assembled relation, said transverse extensions terminating in concealed relation within said handle, and plastic cement joining said plastic securing members to said plastic handle and thereby causing said lateral plastic extensions passing through said transverse blade openings to hold said blade and said blade engaging member in unitary relation with said handle.

MAX H. STORCH.

REFERENCES CITED

The following references are of record in the file of this patent:

UNITED STATES PATENTS

| Number | Name | Date |
|---|---|---|
| 2,072,581 | Curtis | Mar. 2, 1937 |
| 2,335,872 | Mitchell | Dec. 7, 1943 |

FOREIGN PATENTS

| Number | Country | Date |
|---|---|---|
| 515,625 | Great Britain | Dec. 11, 1939 |